United States Patent Office 2,733,155
Patented Jan. 31, 1956

2,733,155

PRINTING INK VARNISH

Ira Williams and Andries Voet, Borger, Tex., assignors to J. M. Huber Corporation, Locust, N. J., a corporation of New Jersey No Drawing. Application September 30, 1952,
Serial No. 312,404

13 Claims. (Cl. 106—30)

This invention relates to printing ink varnishes.

Printing inks consist of a varnish and a coloring agent, the combination forming a mixture with flow characteristics which permit its distribution over the printing plate and its transfer from the printing plate to the surface to be printed. The varnish is usually a solution of a binder for the coloring agent in a liquid vehicle. The liquid vehicle is usually an organic solvent or mixture of organic solvents, which may be diluted with limited amounts of water. Ordinary news ink is composed largely of mineral oil and carbon black to which a wetting agent and binder, such as gilsonite or rosin, is added to produce the desired flow characteristics. Such inks, when applied to a porous surface, dry by absorption of the oil into the printed material and filtration of the carbon black which remains on the surface.

It has been proposed to employ, as the liquid vehicles for ink varnishes and inks, a variety of water-soluble polar solvents such as alcohol, ethylene glycol, propylene glycol, poly glycols, glycol ethers and glycol esters, such solvents being used to dissolve various resins, such as maleic modified rosin, as binders. Such inks may be employed in the moisture or heat set processes, or with no special drying means. Being polar in character, such inks readily wet the paper surface and dry rapidly by penetration. However, such polar solvents are expensive and the resulting inks are high priced, greatly limiting their commercial use.

It is an object of our invention to provide novel ink varnishes which are suitable for the preparation of novel printing inks. Another object is to provide ink varnishes containing novel polar type solvents. A further object is to provide ink varnishes and inks containing less expensive polar type solvents whereby the ink varnishes and the inks will be less costly and hence will have wider commercial application. Other objects are to provide new compositions of matter and to advance the art. Still other objects will appear hereinafter.

The above and other objects may be accomplished in accordance with our invention which comprises dissolving certain resin salts in novel liquid vehicles to produce ink varnishes, and employing such ink varnishes for the preparation of printing inks by incorporating coloring agents therein. The resin salts are those formed from a water-insoluble resin, which has an acid number of at least 90, and a base which has a basic dissociation constant greater than $1 \times 10^{-5}$. The liquid vehicle is composed of an aqueous solution of urea in which the urea is in a concentration of from about 20% to about 60% by weight or a mixture of such aqueous urea solutions with up to about 2.3 parts by weight of at least one neutral water-miscible aliphatic organic solvent selected from the class of alcohols and glycols, ethers of glycols and esters of glycols which contain from 2 to 8 carbon atoms and only carbon, hydrogen and oxygen.

In general, the inks and varnishes of our invention can be set very quickly by a variety of methods. The resins are relatively weak acids and the salts of the nitrogenous bases of our invention are not highly stable but readily decompose under suitable conditions to liberate the free resin which is insoluble in the liquid vehicle employed. The salts of the nitrogenous bases are sufficiently stable in the solutions of our invention to permit the solutions to be used in the usual printing processes but, when in the form of thin films, such as printed films, they decompose during drying, upon the application of a moderate amount of heat, upon the application of moisture in the form of steam or a water mist, or upon the addition of acidic substances having a dissociation constant greater than about $1 \times 10^{-5}$.

Ordinarily, the amounts of heat required will be less than that necessary to evaporate the liquid vehicle and the temperatures will be below those which will deleteriously affect the quality of the material upon which the ink is printed and below the melting point of the resin. Such decomposition of the resin salts liberates free nitrogenous base which is volatilized into the atmosphere and carried away by the air currents, and free resin which is insoluble in the liquid vehicle and which precipitates upon the printed sheet or is filtered out of the liquid vehicle by the sheet through diffusion of the liquid vehicle into the sheet. Thereby, the resin and the coloring material of the ink are deposited mainly upon the surface of the sheet, whereby the printed film has a very considerable gloss. This is a particularly valuable advantage over the usual heat set inks which depend upon rapid volatilization of the solvent and hence require temperatures above the melting point of the resin, resulting in penetration of the molten resin into the sheet with loss of gloss.

When the printed films are set by steam, the salt is decomposed, partly by heat and partly by hydrolysis, and the free nitrogenous base is carried away by the steam. When water mist is employed, the salt is decomposed by hydrolysis, caused by the large excess of water, and the free nitrogenous base is carried away by the flow of the excess water.

The resins, which are employed as the salts in accordance with our invention, are the water-insoluble resins which have an acid number of at least 90. Resins of lower acid numbers are generally unsuitable, usually failing to form salts with the nitrogenous bases or forming salts which are insoluble in the solvents or which are insufficiently soluble in the solvents, particularly with some of the amines of our invention. The resins may be natural or synthetic resins such as rosin, polymerized rosin, disproportioned rosin, hydrogenated rosin, adduct compounds of rosin with alpha-beta unsaturated dicarboxylic acids, copal, sandarac, alkyd resins, adduct compounds of terpenes and alpha-beta unsaturated dicarboxylic acids, and partly esterified resins. The alpha-beta unsaturated dicarboxylic acids, which are used in preparing adduct compounds of the resins and of the terpenes, will usually be maleic acid or fumaric acid, although others are suitable, such as citraconic acid, mesaconic acid, aconitic acid and itaconic acid. We generally prefer the natural resins in their modified and unmodified forms and, particularly, rosin (acid No. 90–180), polymerized rosin (acid No. about 150), disproportioned rosin (acid No. about 150), and hydrogenated rosin (acid No. about 160).

The nitrogenous bases, which are employed to form the resin salts of our invention, have a dissociation constant greater than $1 \times 10^{-5}$. Unless set by acid, the strong non-nitrogenous bases, such as sodium hydroxide and potassium hydroxide, produce water-soluble films, and usually are less desirable than the nitrogenous bases. Weaker bases, such for example as hydroxylamine with a dissociation constant of $1 \times 10^{-8}$ and aromatic amines, do not form resin salts or form resin salts which will not dissolve satisfactorily in the solvents or solvent mixtures. Representative bases, which have dissociation constants greater than $1 \times 10^{-5}$ and which are satisfactory for use in accordance with our invention, are:

| | |
|---|---|
| Sodium hydroxide | Tetraethylene pentamine |
| Potassium hydroxide | Propylene diamine |
| Ammonia | Ethanol amine |
| Methyl amine | Hexyl amine |
| Ethyl amine | Lauryl amine |
| Dimethyl amine | Diethanol amine |
| Diethyl amine | Triethanol amine |
| n-Butyl amine | Morpholine |
| Di-n-butyl amine | Piperidine |
| Triethyl amine | Propyl amine |
| Ethylene diamine | Isopropyl amine |
| Diethylene triamine | Isobutyl amine. |
| Triethylene tetramine | |

The following bases have dissociation constants less than $10^{-5}$ and are unsatisfactory for producing resin salts for use in our invention:

| | |
|---|---|
| Aniline | Beta-naphthlamine |
| p-Toluidine | m-Phenylene diamine |
| Pyridine | p-Phenylene diamine |
| Quinoline | Hydroxylamine |
| Dibenzyl amine | Hexamethylene tetramine |
| Alpha-naphthylamine | Urea |

The base, to be used in any particular case, will depend upon the conditions under which the ink is to be used. Usually, it will be preferred to employ an amine which is less volatile than propyl amine, i.e. which has a vapor pressure lower than 100 mm. of mercury at 20° C. The more volatile amines and ammonia, while forming satisfactory resin salts, are slowly lost from the ink on the distributing system of the press and produce inks with less press stability than is sometimes desired. However, such volatile bases are desirable where the ink is to be dried and set at atmospheric temperatures and pressures as, under such conditions, the base readily and rapidly leaves the printed films, leaving the free resin as the binder. Amines, having a vapor pressure of from 100 to 460 mm. of mercury at 20° C., are most suitable in inks which are to be used on conventional letterpress types of presses. The more volatile bases, having a vapor pressure higher than 460 mm. of mercury at 20° C., are suitable for preparing inks to be used with gravure or aniline types of presses.

The preferred inks and varnishes of our invention are those which have greater press stability, remaining open on the press for about 15 minutes or more. The term "open" means that the ink is in a fluid condition suitable for proper distribution on the press and for printing. An ink, which is not "open," has partly or completely set on the press, is usually too tacky for proper printing, or may even have completely solidified on the forms and the rollers. In order to produce inks and varnishes having such press stability, the base should be one which has a vapor pressure lower than 100 mm. of mercury at 20° C. Such inks are set most conveniently by heat, moisture, acid or a combination of two or more thereof. Where the ink or varnish is to be set quickly by heat alone, the base preferably should be an amine having a vapor pressure of from 0.4 to 100 mm. of mercury at 20° C. The less volatile amines require prolonged heating or undesirably high temperatures and are more conveniently set quickly by the application of moisture, acidic substances, or both.

When the varnishes and inks are to be set by moisture or acidic substances, the base preferably will have a vapor pressure lower than 0.4 mm. of mercury at 20° C. The moisture may be in the form of steam or a water mist, but preferably will be steam. The acidic substances must have a dissociation constant greater than about $1 \times 10^{-5}$, represented by formic acid, acetic acid and sulfur dioxide. More weakly acidic substances, such as carbonic acid, are unsuitable. Preferably, such acidic substances are applied in vapor form admixed with steam or in aqueous solution, as they are more effective when so applied, such combination also being more effective than either steam or moisture alone.

Preferably, the amount of base, employed to form the salts of our invention, will be about that theoretically required to completely neutralize the acidity of the resin. As little as 0.75 of the theoretical amount of the base will usually result in a satisfactory solution, but materially smaller amount ordinarily will not. When the liquid vehicle is composed largely of an organic solvent which is a solvent for the free resin, a small proportion of the free resin can be dissolved in the vehicle and hence can be tolerated. Large excessive amounts of the nitrogenous bases can be employed, except when the ink or varnish is to be set by moisture or when the base is volatile only at undesirably high temperatures. When the amount of base is equal to twice that theoretically required to completely neutralize the acidity of the resin, it will, in most cases, entirely prevent the setting of the varnish or ink by moisture alone. Also, material excesses of base are, in most cases, wasteful and uneconomical. Usually, the amount of base will be from about 0.75 to about 1.25 of the theoretical.

The salts are readily formed by one who is skilled in the art. It is only necessary to bring the resin and the base together under conditions such that they can mix. In some cases, the resin can be melted and the base can then be stirred directly into the melted resin. In case the base is somewhat volatile, it may be dissolved in the solvent, intended to form the solution of the salt, and the acidic resin can then be stirred into this solution until it becomes completely dissolved.

The liquid vehicles for the varnishes and inks of our invention comprise aqueous solutions of urea in which the urea is in a concentration of from about 20% to about 60% by weight, preferably from about 30% to about 50% by weight, the most useful concentration being about 50% by weight. Urea readily forms hydrogen bonds with many substances containing oxygen, sulfur or nitrogen or combinations of these elements, particularly when such element or elements form part of a resonating structure. Urea, dissolved in water, appears to form such additions and to hold the water in such a form that the solvent characteristics of the solution are quite different from the solvent properties of water alone. For instance, acidic resins of our invention, in the presence of just sufficient ammonia to form the ammonium salt, dissolve very little or not at all in water but, when 50 per cent urea solutions are substituted, smooth, viscous solutions, resembling similar solutions prepared with the glycols, are formed. On the other hand, the free resins, as distinguished from the salts, are insoluble or substantially insoluble in the solutions of urea in water and generally in mixtures of such urea solutions with minor proportions of the organic solvents.

The aqueous solutions of urea may constitute the sole solvent for certain types of varnishes and inks. Such varnishes and inks constitute completely non-flammable and non-toxic systems for replacing the present gravure and aniline inks based on volatile hydrocarbons and other flammable organic solvents. The urea-water system is surprisingly resistant to volatilization and, when used in gravure or aniline inks, much of the drying is accomplished by penetration into the paper.

However, inks and varnishes of higher and lower volatility are frequently required. The volatility of the inks and varnishes of our invention may be widely varied by adding to the aqueous urea solutions up to about 2.3 parts by weight of certain organic solvents of higher or lower volatility, preferably from about 0.25 to about 2 parts by weight. Materially more than 2.3 parts of the organic solvent will be undesirable as it will tend to cause the urea to slowly precipitate from the mixture. Usually, not more than about 1 part by weight of the organic solvent will be required, particularly when it is less volatile than the aqueous urea solution. For example, an ink, which contained 50% by weight of a 50% solution of urea in water and 50% by weight of propylene glycol, remained open on one side of a Vandercook proving press for 30 minutes; while a commercial ink in which the liquid vehicle was a relatively non-volatile hydrocarbon, on the other side of the press, began to dry in 3 minutes and would not print satisfactorily after 5 minutes. The preferred varnishes and inks of our invention are those in which the liquid vehicle is a mixture of the solution of urea in water and a glycol, ether of a glycol or ester of a glycol in the proportions above indicated, and particularly in a proportion of from about 0.25 to about 1 part by weight for each part of the water solution of urea.

When the liquid vehicle is a mixture of aqueous urea and an organic solvent, the urea should be dissolved in the water before mixing with the organic solvent. Urea dissolves slowly or not at all in mixtures of water and organic solvent, particularly when the proportion of organic solvent is high.

The organic solvents, which may be so employed in accordance with our invention, are neutral water-miscible aliphatic organic solvents, preferably those in which the free resin is insoluble. The solubilities and insolubilities of the natural resins in the organic solvents are well-known to the art and are disclosed in "The Technology of Natural Resins" by Mantell et al. published by John Wiley & Sons in 1942. The solubilities and insolubilities of the synthetic resins are also well-known to the art and are published by the manufacturers of the particular resins.

Suitable solvents are alcohols, such as methanol, ethanol, propanol and glycerol, and glycols, ethers of glycols, and esters of glycols. The glycols, ethers of glycols and esters of glycols, which contain from 2 to 8 carbon atoms and only carbon, hydrogen and oxygen, will generally be preferred, including the poly glycols. However, poly glycols, having a molecular weight of about 600 and above, are not water-miscible and hence will not be suitable. Representative glycols and their ethers and esters, which are satisfactory are ethylene glycol, diethylene glycol, triethylene glycol, dipropylene glycol, butylene glycol-1,2, hexylene glycol, Cellosolve, butyl Cellosolve, monobutyl ether of ethylene glycol, monomethyl ether of ethylene glycol, monoethyl ether of ethylene glycol, monomethyl ether of diethylene glycol, monoethyl ether of diethylene glycol, monobutyl ether of diethylene glycol, ethylene glycol monomethyl ether acetate, diethylene glycol monoethyl ether acetate and triethylene glycol methyl ether acetate.

Each of the free resins, individually, is soluble in one or more of such solvents but is insoluble in others, as is well-known to the art, and the solvent or solvents to be employed with any particular resin will be selected accordingly.

The amount of resin salt, employed in the ink or varnish, will depend upon the viscosity desired in the varnish and in the ink prepared therefrom. Usually, the resin salt will be dissolved in the liquid vehicle in a concentration of from about 20% to about 75% by weight and, preferably, from about 40% to about 60% by weight.

The varnishes of our invention may be employed in any conventional manner for the preparation of printing inks by incorporating the usual coloring materials therein. Colored pigments may be incorporated into the varnishes by means of a roller mill or a ball mill, or wet filter cakes of the pigment may be stirred into the varnish and dispersed therein. In other cases, the ink may be formed by the addition to the varnish of soluble dyestuffs as the coloring agents. Suitable pigments include carbon black, titanium dioxide, red pigment, milori blue, and the like.

The amount of pigment employed will be that ordinarily used to provide inks of the desired color and viscosity. Usually, the pigment will be in a proportion of from about 2% to about 60% by weight based on the liquid medium of the varnish. In the case of carbon black, the amount will be from about 2% to about 31% by weight of the liquid medium and, preferably, from about 9% to about 31%.

In order to more clearly illustrate our invention, preferred modes of carrying the same into effect, and the advantageous results to be obtained thereby, the following examples are given, in which amounts are by weight except where otherwise specifically indicated.

*Example I*

Wood rosin, having an acid number of 180, was powdered and 25 grams were added to 70 grams of water containing 5 grams of ethanol amine. The rosin reacted slowly, and the product finally assumed the form of a solid gel which was of no value as an ink varnish. When the experiment was repeated with 70 grams of a 50% solution of urea in water replacing the 70 grams of water, a smooth viscous liquid resulted which was well suited for use as an ink varnish.

*Example II*

25 grams of powdered water white rosin were treated with 5 grams of ethanol amine and 70 grams of various urea solutions in water in which the amount of urea was varied as shown in the following table.

| Percent Urea in water | Rate of solution to give a Uniform viscous liquid | |
|---|---|---|
| | 20° C. | 50° C. |
| 0 | Did not dissolve | Did not dissolve. |
| 10 | do | Do. |
| 20 | Viscous liquid in 60 min | Viscous liquid in 40 min. |
| 30 | Liquid in 30 min | Liquid in 10 min. |
| 40 | Dissolved rapidly to give a thin fluid. | Dissolved rapidly to give a thin fluid. |
| 50 | do | Do. |
| 60 | do | Do. |

*Example III*

15 grams of polymerized rosin, having an acid number of about 150, were dissolved in 100 grams of a 50% solution of urea in water containing 4 cc. of ammonium hydroxide. The resulting smooth solution was diluted by the addition of 35 grams of butylene glycol 2-3. The resulting clear viscous solution was suitable for use as an ink varnish.

The same results were obtained when potassium hydroxide was substituted in an amount equivalent to the ammonium hydroxide.

*Example IV*

25 parts of water white rosin is dissolved at boiling temperature in 75 parts of a mixture of equal parts by weight of urea and water containing the exact equivalent of KOH required for the neutralization of the rosin. The rosin dissolves easily and completely. Upon cooling, a stable viscous varnish is formed.

If, instead of urea and water, only water is used, the dissolution of the rosin is slow and incomplete. Upon cooling, a large part of the dissolved rosin precipitates.

*Example V*

25 parts of water white rosin is dissolved at boiling temperature in 75 parts of a mixture of equal parts by weight of urea and water containing the exact equivalent of morpholine required for the neutralization of the rosin. The rosin dissolves easily and completely. Upon cooling, a free flowing varnish is obtained.

If, instead of water and urea, only water is used, the solution sets into a solid gel upon cooling.

Varnishes may also be prepared which contain mixed solvents by first dissolving the resin in a conventional solvent followed by the addition of a solution of urea in water.

Example VI

A 30% solution of "Vinsol" (gasoline-insoluble wood rosin), having an acid number of 90, was made in butyl Carbitol and was neutralized with ammonia. A 50 gram portion of this product was diluted with 100 grams of a 50% solution of urea in water. The resulting product was a smooth slightly viscous liquid. When water was used instead of the urea solution, all of the resin was precipitated.

Example VII

A 30% solution of polymerized rosin was made in butylene glycol 2-3 and neutralized with ammonia. 200 grams of water were added to a 50 cc. portion of the rosin solution in glycol. This precipitated all of the resin. When a second 50 cc. portion was treated with 200 grams of a 50% solution of urea in water, the solution remained clear.

Example VIII

A solution of 30 parts of rosin was prepared in 36 parts of a 50% urea solution in water, 4 parts of ammonium hydroxide and 30 parts of ethanol. 6 parts of phthalocyamine blue and 12 parts of calcium carbonate were then incorporated on a 3 roll ink mill. The resulting blue ink was suitable for rapid drying by vehicle absorption or more rapidly when used as a heat set ink.

The varnishes of this invention and inks prepared from them may be dried by absorption of the solvent or solvent mixture into the paper or by applying heat to volatilize the solvent. However, most of them are capable of being quickly set by at least three different methods, all of which depend upon the decomposition of the salt and the liberation of the free resin which is no longer soluble in the solvent or mixture of solvents employed.

The first method consists in the application of heat. Unlike conventional heat set inks, the process does not depend on volatilization of the solvent but depends on the generation of the free resin which becomes insoluble and permits the solvent to diffuse into the paper. The salts of the nitrogenous bases readily decompose under the application of heat to liberate free resin and free base. During the drying operation, this base can be detected by means of indicator paper above the surface of the drying film. If this liberated base is removed as it forms, the entire resin salt will be decomposed to liberate all of the resin. The base is easily removed from thin films, such as printed films, by volatilization into the air. It is obvious that the more volatile amines and ammonia would be lost most easily and the less volatile amines, such as triethanol amine, will be lost more slowly and only at higher temperatures, as long as the basic strength of the amines are the same. By choosing bases of different volatility and basic dissociation constant, the press stability and the temperature, required to set the ink after printing, can be controlled.

The temperatures, required to dry in ten seconds for varnishes containing resin salts of n-butyl amine, ethylene diamine, morpholine and ethanol amine, were 68° C., 82° C., 76° C. and 64° C., respectively. In this case, the relatively higher boiling point of ethanol amine was balanced by its lower dissociation constant, so that it was removed as readily as the more volatile n-butyl amine.

The second method, by which these varnishes and inks may be set, is by the application of moisture. In most cases, this type of setting is caused primarily by hydrolysis of the resin salt to liberate the free nitrogenous base, and partly by dilution of the solvent so that the resin salt is no longer soluble therein. This type of setting is therefore retarded by the presence of an excess of relatively nonvolatile base which suppresses the hydrolysis.

The third method, of setting the varnishes or inks of our invention, is by means of acidic substances. Since the resins are weakly acidic substances, the base is quite easily replaced to free the resin which at once becomes insoluble.

It will be understood that the preceding examples have been given for illustrative purposes solely and that our invention is not limited to the specific embodiments disclosed therein. On the other hand, it will be readily apparent to those skilled in the art that many variations can be made in the resins, the bases, and the solvents employed, in the proportions of the ingredients, and in the techniques used, within the limits hereinbefore set forth, without departing from the spirit or scope of our invention.

The inks, prepared from most of the varnishes of our invention, are suitable for high speed printing of coated magazine stock and will dry with the application of very little heat to give a hard and rubproof print which is insoluble in water and which exhibits almost no offset or show through. Such inks also give sharp reproduction on newsprint to produce a sheet which does not offset during printing and which will not smear or rub off.

It will be apparent that, by our invention, we have provided novel varnishes and printing inks which have many valuable advantageous properties. The varnishes and inks, which contain the less volatile organic solvents and the resin salts of the less volatile amines, are particularly valuable because of their press stability. Accordingly, it will be apparent that our invention constitutes a valuable contribution to and advance in the art.

We claim:

1. An ink varnish consisting essentially of a salt of a waterinsoluble resin having an acid number of at least 90 and a base having a basic dissociation constant greater than $1 \times 10^{-5}$ which base is a member of the group consisting of sodium hydroxide, potassium hydroxide and a nitrogenous base containing no other elements than nitrogen, hydrogen, carbon and oxygen, said salt being dissolved in a concentration of from about 20% to about 75% by weight in a liquid vehicle of the class consisting of an aqueous solution of urea in which the urea is in a concentration of from about 20% to about 60% by weight and mixture of such an aqueous urea solution with up to about 1 part by weight of at least one neutral water-miscible aliphatic organic solvent for each part of the aqueous urea solution, said organic solvent being selected from the group consisting of monohydroxy alcohols and glycols, aliphatic ethers of glycols and aliphatic esters of glycols which glycols, ethers of glycols and esters of glycols contain from 2 to 8 carbon atoms and only carbon, hydrogen and oxygen.

2. An ink varnish consisting essentially of a salt of a water-insoluble resin having an acid number of at least 90 and a nitrogenous base containing no other elements than nitrogen, hydrogen, carbon and oxygen and having a basic dissociation constant greater than $1 \times 10^{-5}$, said salt being dissolved in a concentration of from about 20% to about 75% by weight in a liquid vehicle of the class consisting of an aqueous solution of urea in which the urea is in a concentration of from about 20% to about 60% by weight and mixtures of such an aqueous urea solution with up to about 1 part by weight of at least one neutral water-miscible aliphatic organic solvent for each part of the aqueous urea solution, said organic solvent being selected from the group consisting of monohydroxy alcohols and glycols, aliphatic ethers of glycols and aliphatic esters of glycols which glycols, ethers of glycols and esters of glycols contain from 2 to 8 carbon atoms and only carbon, hydrogen and oxygen.

3. An ink varnish consisting essentially of a salt of a water-insoluble resin having an acid number of at least 90 and a base having a basic dissociation constant greater than $1 \times 10^{-5}$ which base is a member of the group consisting of sodium hydroxide, potassium hydroxide and a nitrogenous base containing no other elements than nitrogen, hydrogen, carbon and oxygen, said salt being dissolved in a concentration of from about 40% to about 60% by weight in a liquid vehicle of the class consisting of an aqueous solution of urea in which the urea is in a concentration of from about 20% to about 60% by weight and mixtures of such an aqueous urea solution with up to about 1 part by weight of at least one neutral water-miscible aliphatic organic solvent for each part of the aqueous urea solution, said organic solvent being selected from the group consisting of monohydroxy alcohols and glycols, aliphatic ethers of glycols and aliphatic esters of glycols which glycols, ethers of glycols and esters of glycols contain from 2 to 8 carbon atoms and only carbon, hydrogen and oxygen.

4. An ink varnish consisting essentially of a salt of a water-insoluble resin having an acid number of at least 90 and a nitrogenous base containing no other elements than nitrogen, hydrogen, carbon and oxygen and having a basic dissociation constant greater than $1 \times 10^{-5}$, said salt being dissolved in a concentration of from about 40% to about 60% by weight in a liquid vehicle of the class consisting of an aqueous solution of urea in which the urea is in a concentration of from about 20% to about 60% by weight and mixtures of such an aqueous urea solution with up to about 1 part by weight of at least one neutral water-miscible aliphatic organic solvent for each part of the aqueous urea solution, said organic solvent being selected from the group consisting of monohydroxy alcohols and glycols, aliphatic ethers of glycols and aliphatic esters of glycols which glycols, ethers of glycols and esters of glycols contain from 2 to 8 carbon atoms and only carbon, hydrogen and oxygen.

5. An ink varnish consisting essentially of a salt of a water-insoluble resin having an acid number of at least 90 and a base having a basic dissociation constant greater than $1 \times 10^{-5}$ which base is a member of the group consisting of sodium hydroxide, potassium hydroxide and a nitrogenous base containing no other elements than nitrogen, hydrogen, carbon and oxygen, said salt being dissolved in a concentration of from about 20% to about 75% by weight in an aqueous solution of urea in which the urea is in a concentration of from about 20% to about 60% by weight.

6. An ink varnish consisting essentially of a salt of a water-insoluble resin having an acid number of at least 90 and a nitrogenous base containing no other elements than nitrogen, hydrogen, carbon and oxygen and having a basic dissociation constant greater than $1 \times 10^{-5}$, said salt being dissolved in a concentration of from about 20% to about 75% by weight in an aqueous solution of urea in which the urea is in a concentration of from about 20% to about 60% by weight.

7. An ink varnish consisting essentially of a salt of a water-insoluble resin having an acid number of at least 90 and a base having a basic dissociation constant greater than $1 \times 10^{-5}$ which base is a member of the group consisting of sodium hydroxide, potassium hydroxide and a nitrogenous base containing no other elements than nitrogen, hydrogen, carbon and oxygen, said salt being dissolved in a concentration of from about 20% to about 75% by weight in an aqueous solution of urea in which the urea is in a concentration of from about 30% to about 50% by weight.

8. An ink varnish consisting essentially of a salt of a water-insoluble resin having an acid number of at least 90 and a base having a basic dissociation constant greater than $1 \times 10^{-5}$ which base is a member of the group consisting of sodium hydroxide, potassium hydroxide and a nitrogenous base containing no other elements than nitrogen, hydrogen, carbon and oxygen, said salt being dissolved in a concentration of from about 20% to about 75% by weight in an aqueous solution of urea in which the urea is in a concentration of about 50% by weight.

9. An ink varnish consisting essentially of a salt of a water-insoluble resin having an acid number of at least 90 and a base having a basic dissociation constant greater than $1 \times 10^{-5}$ which base is a member of the group consisting of sodium hydroxide, potassium hydroxide and a nitrogenous base containing no other elements than nitrogen, hydrogen, carbon and oxygen, said salt being dissolved in a concentration of from about 20% to about 75% by weight in a mixture of an aqueous solution of urea, in which the urea is in a concentration of from about 20% to about 60% by weight, with from about 0.25 to about 1 part by weight of at least one neutral water-miscible aliphatic organic solvent for each part of the aqueous urea solution, said organic solvent being selected from the group consisting of monohydroxy alcohols and glycols, aliphatic ethers of glycols and aliphatic esters of glycols which glycols, ethers of glycols and esters of glycols contain from 2 to 8 carbon atoms and only carbon, hydrogen and oxygen.

10. An ink varnish consisting essentially of a salt of a water-insoluble resin having an acid number of at least 90 and a nitrogenous base containing no other elements than nitrogen, hydrogen, carbon and oxygen and having a basic dissociation constant greater than $1 \times 10^{-5}$, said salt being dissolved in a concentration of from about 20% to about 75% by weight in a mixture of an aqueous solution of urea, in which the urea is in a concentration of from about 20% to about 60% by weight, with from about 0.25 to about 1 part by weight of at least one neutral water-miscible aliphatic organic solvent for each part of the aqueous urea solution, said organic solvent being selected from the group consisting of monohydroxy alcohols and glycols, aliphatic ethers of glycols and aliphatic esters of glycols which glycols, ethers of glycols and esters of glycols contain from 2 to 8 carbon atoms and only carbon, hydrogen and oxygen.

11. An ink varnish consisting essentially of a salt of a water-insoluble resin having an acid number of at least 90 and a nitrogenous base containing no other elements than nitrogen, hydrogen, carbon and oxygen and having a basic dissociation constant greater than $1 \times 10^{-5}$, said salt being dissolved in a concentration of from about 20% to about 75% by weight in a mixture of an aqueous solution of urea, in which the urea is in a concentration of from about 30% to about 50% by weight, with from about 0.25 to about 1 part by weight of at least one neutral water-miscible aliphatic organic solvent for each part of the aqueous urea solution, said organic solvent being selected from the group consisting of monohydroxy alcohols and glycols, aliphatic ethers of glycols and aliphatic esters of glycols which glycols, ethers of glycols and esters of glycols contain from 2 to 8 carbon atoms and only carbon, hydrogen and oxygen.

12. An ink varnish consisting essentially of a salt of a water-insoluble resin having an acid number of at least 90 and a nitrogenous base containing no other elements than nitrogen, hydrogen, carbon and oxygen and having a basic dissociation constant greater than $1 \times 10^{-5}$, said salt being dissolved in a concentration of from about 20% to about 75% by weight in a mixture of an aqueous solution of urea, in which the urea is in a concentration of about 50% by weight, with from about 0.25 to about 1 part by weight of at least one neutral water-miscible aliphatic organic solvent for each part of the aqueous urea solution, said organic solvent being selected from the group consisting of monohydroxy alcohols and glycols, aliphatic ethers of glycols and aliphatic esters of glycols which glycols, ethers of glycols and esters of glycols contain from 2 to 8 carbon atoms and only carbon, hydrogen and oxygen.

13. An ink varnish consisting essentially of a salt of a water-insoluble resin having an acid number of at least 90 and a nitrogenous base containing no other elements than nitrogen, hydrogen, carbon and oxygen and having a basic dissociation constant greater than $1 \times 10^{-5}$, said salt being dissolved in a concentration of from about 40% to about 60% by weight in a mixture of an aqueous solution of urea, in which the urea is in a concentration of from about 20% to about 60% by weight, with from about 0.25 to about 1 part by weight of at least one neutral water-miscible aliphatic organic solvent for each part of the aqueous urea solution, said organic solvent being selected from the group consisting of monohydroxy alcohols and glycols, aliphatic ethers of glycols and aliphatic esters of glycols which glycols, ethers of glycols and esters of glycols contain from 2 to 8 carbon atoms and only carbon, hydrogen and oxygen.

References Cited in the file of this patent

UNITED STATES PATENTS

| | | |
|---|---|---|
| 2,128,599 | Albrecht et al. | Aug. 30, 1938 |
| 2,245,100 | Bernstein | June 10, 1941 |
| 2,436,954 | Denton | Mar. 2, 1948 |
| 2,450,959 | Heinecke | Oct. 12, 1948 |
| 2,540,776 | Cadwell | Feb. 6, 1951 |

FOREIGN PATENTS

| | | |
|---|---|---|
| 599,232 | Great Britain | Mar. 8, 1948 |

OTHER REFERENCES

Ellis: "Printing Inks" (1940), pages 392 and 393.
Gregory: "Uses and Applications of Chemicals and Related Materials" (1939), pages 629, 630, 631.